US006480373B1

(12) United States Patent
Landry et al.

(10) Patent No.: US 6,480,373 B1
(45) Date of Patent: Nov. 12, 2002

(54) MULTIFUNCTIONAL FOLDABLE COMPUTER

(75) Inventors: Christian C. Landry, The Woodlands, TX (US); Michael J. Scully, San Francisco, CA (US); John E. Youens, Magnolia, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/912,759

(22) Filed: Jul. 24, 2001

(51) Int. Cl.[7] ................................................ H05K 7/16
(52) U.S. Cl. .................... 361/680; 361/679; 16/308; 708/142
(58) Field of Search ................................ 361/680, 685, 361/724–725, 686, 677–679, 681–683, 687; 16/368, 308, 341, 342; 708/139–142

(56) References Cited

U.S. PATENT DOCUMENTS 6,185,096 B1    2/2001  Helot et al. ................. 361/686
6,256,192 B1 *  7/2001  Shannon ..................... 361/683
6,295,038 B1    9/2001  Rebeske ........................ 345/1
6,296,408 B1 * 10/2001  Larkin et al. ............... 400/682
6,353,529 B1 *  3/2002  Cies ........................... 361/681
6,392,877 B1    5/2002  Iredale ....................... 361/683

OTHER PUBLICATIONS

Attached illustrations—2 pages; received from an outside party in correspondence dated May 31, 2001.

* cited by examiner

Primary Examiner—Darren Schuberg
Assistant Examiner—Hung Van Duong
(74) Attorney, Agent, or Firm—Fletcher, Yoder & Van Someren

(57) ABSTRACT

A multi-functional computing device that is configurable for a plurality of applications. The technique includes a space saving and configuration technique utilizing multiple joints disposed between multiple sections to facilitate rotational orientation of the sections to adapt to space limitations and other characteristics of a desired environment or application. The multiple sections include a display assembly and a housing assembly for computing components.

39 Claims, 5 Drawing Sheets

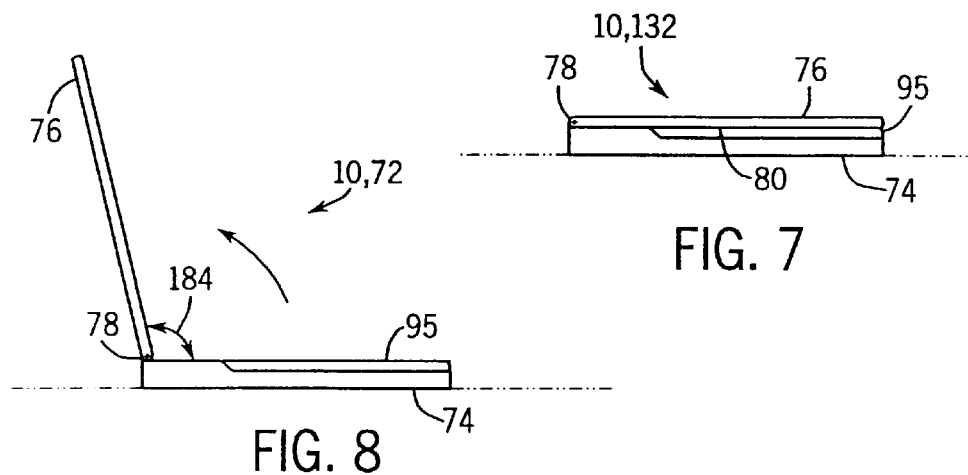
FIG. 7
FIG. 8
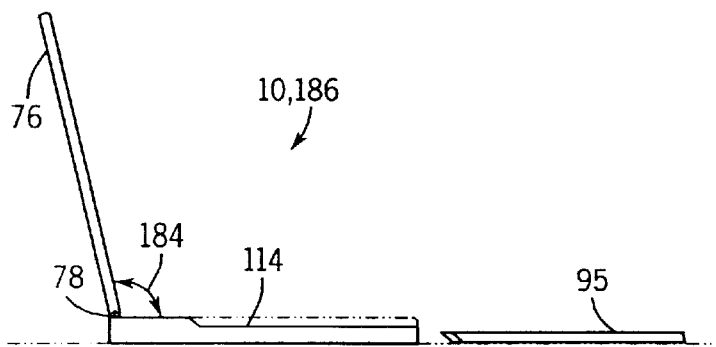
FIG. 9
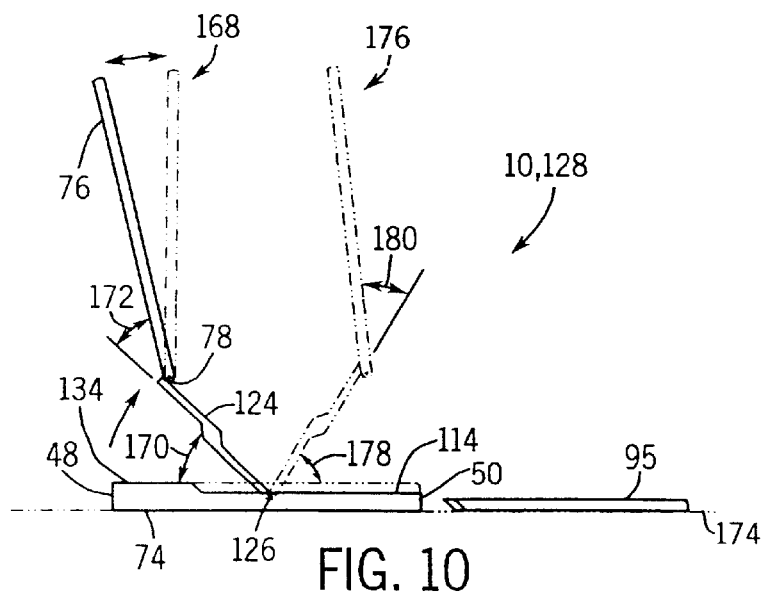
FIG. 10

MULTIFUNCTIONAL FOLDABLE COMPUTER

FIELD OF THE INVENTION

The present technique relates generally to the field of computer systems and, more specifically, to a unique computing device adaptable to multiple computing environments, e.g. as a portable computer or a desktop computer, and space constraints. The present technique is a system and method for flexibly integrating computing components to facilitate multiple operating arrangements in various environments, each of which may have particular operational constraints for use of a computer system.

BACKGROUND OF THE INVENTION

Computer systems generally include a computer unit and peripherals. For example, a typical computer unit may include a computer housing having a motherboard, a processor, a hard drive, random access memory (RAM), a disk drive (e.g., a floppy drive, a CD-ROM drive, a DVD-ROM drive, a tape drive, etc.), communication ports, a cooling system (e.g., a fan), a power supply, a modem, a network device, an audio assembly (e.g., a sound card, a speaker, etc.), and other computing devices. The computer system also may include peripherals, such as a monitor, a printer, a scanner, a keyboard, a mouse, speakers, a disk drive or other storage devices, a modem or other communication devices, and various other standalone components. Accordingly, a typical computer system includes a variety of separate components communicating through various ports, such as serial, parallel, PS/2, video, USB, IRDA (infrared), and various other communication protocols. Moreover, each of these components consumes a considerable amount of workspace.

Conventional computer systems are generally grouped and designed for distinct operating environments, such as home use, mobile use, or commercial use. For example, a typical consumer may have a home computer, a work computer, and a laptop computer. The home and work computers are typically desktop computers, which consume a considerable amount of space and have a number of peripheral components consuming additional space. Laptop computers are relatively more compact than desktop computers, yet laptop computers generally have limited resources and are often inconvenient to use in the typical non-mobile working environment. Moreover, each computer system costs a substantial amount of money, while the consumer is not gaining any additional resources other than cumulative resources designed for particular working environments.

Regardless of the type of computer system (i.e., desktop or portable), a significant amount of workspace is consumed due to the conventional orientation of computer components. For example, desktop units have a large footprint in both horizontal and vertical orientations. Monitors also have a large footprint, which generally increases with the viewable area. Laptop computers consume less space than desktop computers, but are intended for mobile use. For many users, the display screen, the keyboard, and other features of laptop computers are difficult or inconvenient to use. Accordingly, laptop computers are often connected to standard monitors, keyboards, and other desktop devices during non-mobile operation. Moreover, the laptop itself has a considerably large footprint, and also requires extra space for the display to be oriented at a desired viewing angle.

SUMMARY OF THE INVENTION

According to one aspect of the present invention, a multi-functional computing device is provided that may be configured for a plurality of applications. The computing device utilizes multiple joints disposed between multiple sections to facilitate rotational orientation of the sections to adapt to space limitations and other characteristics of a desired environment or application. The multiple sections include a display assembly and a housing assembly for computing components.

Another aspect of the present technique comprises a computer having a multi-configurable computer structure, which includes multiple sections and a display. A first section is provided with computing circuitry. A second section is rotatably coupled to the first section. The computer structure also includes a display, which is rotatably coupled to the second section.

Another aspect of the present technique comprises a method of forming a versatile computing device. The method includes rotatably coupling a plurality of body sections, at least one of which is configured to house computing circuitry. A display is also rotatably coupled to one of the plurality of body sections. The method also includes facilitating geometrical adaptation of the plurality of body sections and the display to a desired application.

BRIEF DESCRIPTION OF THE DRAWINGS

The invention will hereafter be described with reference to the accompanying drawings, wherein like reference numerals denote like elements, and:

FIG. 7 is a side view of the computing device in the closed configuration, as illustrated in FIG. 1;

FIG. 8 is a side view of the computing device in the open configuration, as illustrated in FIG. 2;

FIG. 9 is a side view of the computing device in the open configuration, as illustrated in FIG. 3;

FIG. 10 is a side view of the computing device in the extended open configuration, as illustrated in FIGS. 5 and 6;

DETAILED DESCRIPTION OF SPECIFIC EMBODIMENTS

Figure 1:
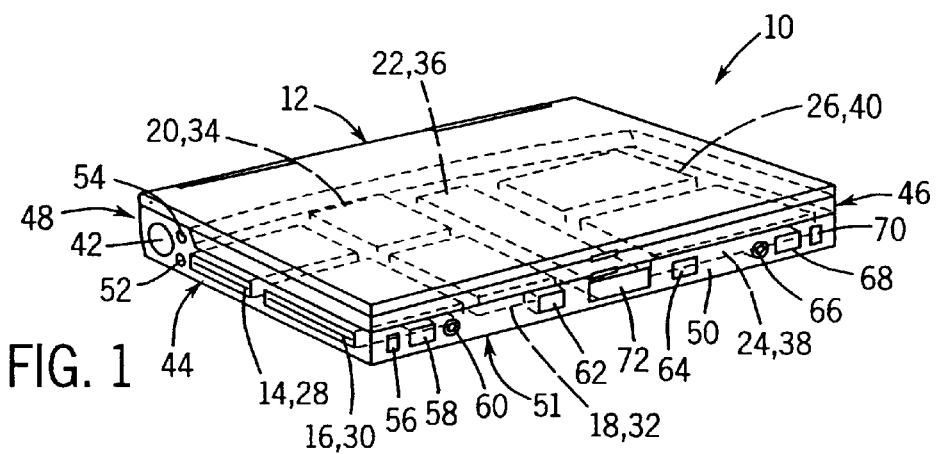
FIG. 1 is a front perspective view of an exemplary computing device of the present technique in a closed configuration.

FIG. 1 is a perspective view of an exemplary computing device 10 of the present technique. As illustrated, the computing device 10 has a body 12 housing a plurality of bays for devices and other computing circuitry. For example, the body 12 may have bays 14, 16, 18, 20, 22, 24 and 26 for devices 28, 30, 32, 34, 36, 38 and 40, respectively. These bays may be modular bays adapted for removable insertion of the devices, or these bays may be adapted for fixed insertion of the devices into the body 12. Also, the bays 14, 16, 18, 20, 22, 24 and 26 may be adapted for hot-plugging or plug-and-play insertion and configuration of the devices in the body 12 of the computing device 10. The devices 28, 30, 32, 34, 36, 38 and 40 may comprise a variety of computing components, such as a battery, a power supply, a disc drive, a hard drive, ram memory, a processor, a CD Rom drive, a CD-RW drive, a DVD Rom drive, a DVD Ram drive, a DVD-R drive, a DVD-RW drive, a tape drive, a communication device (e.g., a modem, a network card, wireless technology, blue tooth technology, etc.), and various other circuits and electronic components for the computing device 10. In the illustrated embodiment, the devices 28, 30, 32, 34, 36, 38, and 40 may include standard computing components (e.g., a desktop component, a laptop component, etc.), or it may comprise a unique class of computing components or customized compact components. It should also be pointed out that the bays 14, 16, 18, 20, 22, 24 and 26 maybe accessible on a side 44, a side 46, a rear 48, a front 50 or a bottom section 51, as desired for a particular application of the computing device 10. The computing device 10 also may have one or more cooling assemblies, such as a fan 42, to ensure a desired operating temperature of the computing circuitry (e.g., devices 28–40).

The computing device 10 also has a variety of communication assemblies, data transfer assemblies, and ports to facilitate interaction between the computing device 10 and a user or an external device. For example, various standard and custom communication technologies may be coupled to ports, such as ports 52, 54, 56, 58, 60, 62, 64, 66, 68 and 70, which may include a serial port, a parallel port, a USB port, a PS/2 port, a video port, an audio port, an optical/digital port, and a wireless port (e.g., a radio frequency port, a blue tooth port, an optical port, etc.). The computing device 10 also may have a display 72, which may be an LCD display, for displaying status or other information for the computing device 10. In this exemplary embodiment, the ports 52–70 and the display 72 may be disposed on the side 44, the side 46, the rear 48, the front 50 or any other suitable section of the computing device 10.

Figure 2:
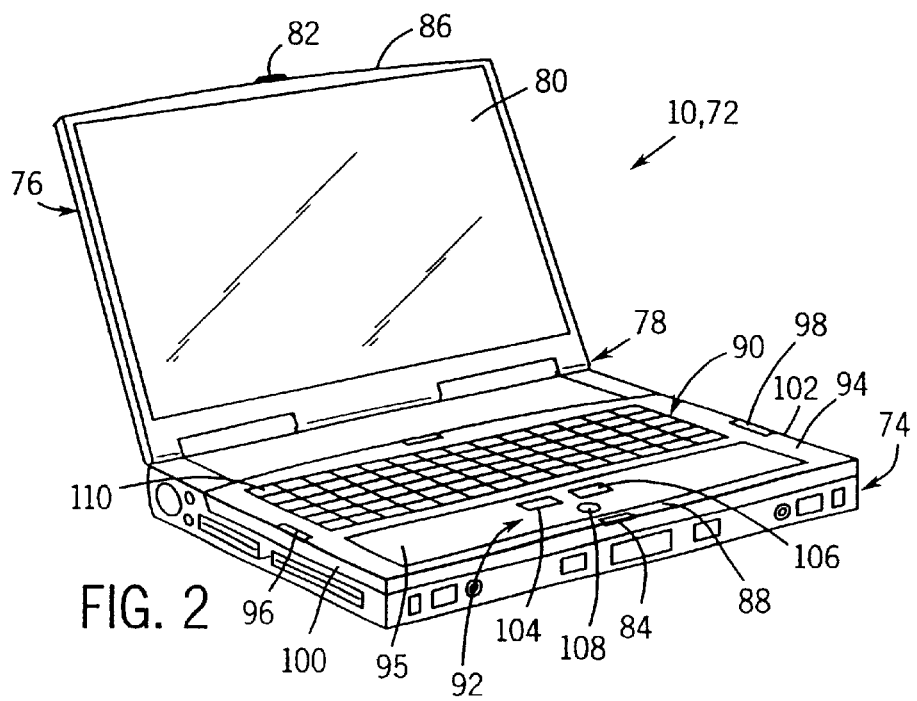
FIG. 2 is a front perspective view of the computing device in an open configuration having a display section angularly rotated about a base section.

In accordance with the present technique, the computing device 10 is configured to facilitate multiple mounting positions and viewing angles adaptable to a desired working environment. For example, the computing device 10 may be quickly adapted to a home use environment, a travel environment, a business environment, a specific space limitation, and various other space limitations and working environments. As illustrated in FIG. 2, the computing device 10 is provided in an operational configuration 72, which may be particularly well suited for a horizontal mount in a home or office environment.

In the illustrated embodiment, the computing device 10 has a base 74 and a display 76, which is rotatably coupled to the base 74 at a hinge structure 78 disposed between the display 76 and the base 74. The display 76 also has a display screen 80, which may be a flat screen or another compact display assembly having a relatively low profile. For example, the display screen 80 may be a liquid crystal display ("LCD") screen having dimensions (e.g., 4", 8", 12", 16", 20", 24", 28", or other diagonal dimension) suitable for a particular application. The display 76 also has a latch mechanism 82 for removable coupling with a latch 84 disposed on the base 74. In the illustrated embodiment, the latch mechanism 82 is disposed on an edge 86 of the display 76, while the latch 84 is disposed on an edge 88 adjacent the front 50 of the base 74. However, the latch mechanism 82 and corresponding latch 84 may be disposed on other portions of the computing device 10, such as the side 44, the side 46, or other desired sections of the computing device 10.

The base 74, in addition to having one or more of the bays 14, 16, 18, 20, 22, 24, and 26, also has a keyboard 90 and a pointing device 92 disposed on a top section 94 of the base 74. As illustrated, the keyboard 90 and the pointing device 92 are incorporated into a removable user interaction device 95, which embodies a slim panel that can be optionally removed to enhance versatility of the computing device 10. Accordingly, the keyboard 90 has releases 96 and 98 disposed on opposite sides 100 and 102 of the keyboard 90 for removing the keyboard from the base 74. For example, the releases 96 and 98 may be slidable release mechanisms, rotatable release mechanisms, push button release mechanisms, or other suitable release mechanisms. Alternatively, the keyboard 90 may have an automatic release mechanism or a software-assisted release mechanism. Accordingly, the keyboard release mechanism may be triggered by a click of a button or other software, hardware, or user interaction events of the computing device 10. The pointing device 92, as illustrated in FIG. 2, includes buttons 104 and 106 and a roller ball 108 (e.g., a track ball). However, the pointing device 92 may include any suitable pointing mechanism and any number of buttons or other input technologies. It should also be noted that the pointing device 92 may be fixedly or removably coupled to the removable user interaction device 95. For example, the pointing device 92 may have a mechanical or electrical release mechanism disposed on the removable user interaction device 95, thereby facilitating maximum flexibility and adaptability to a desired working environment.

In the illustrated embodiment of FIG. 2, the various bays 14, 16, 18, 20, 22, 24, and 26 and the corresponding devices 28, 30, 32, 34, 36, 38, and 40 may be disposed entirely in the base 74 or partially in the base 74 and the display 76. For example, a low profile memory device, a low profile processing device, a low profile card or disc device, or any other suitable device may be disposed behind the display screen 80 in the display 76. Moreover, the computing device 10 may have a button, such as a hot key 110 on the keyboard 90, for releasing the removable user interaction device 95 from the base 74 or for separating the keyboard 90 from the pointing device 92. Accordingly, the keyboard 90 and the pointing device 92 can be quickly separated from the computing device 10 and can be positioned in a desired orientation.

Figure 3:
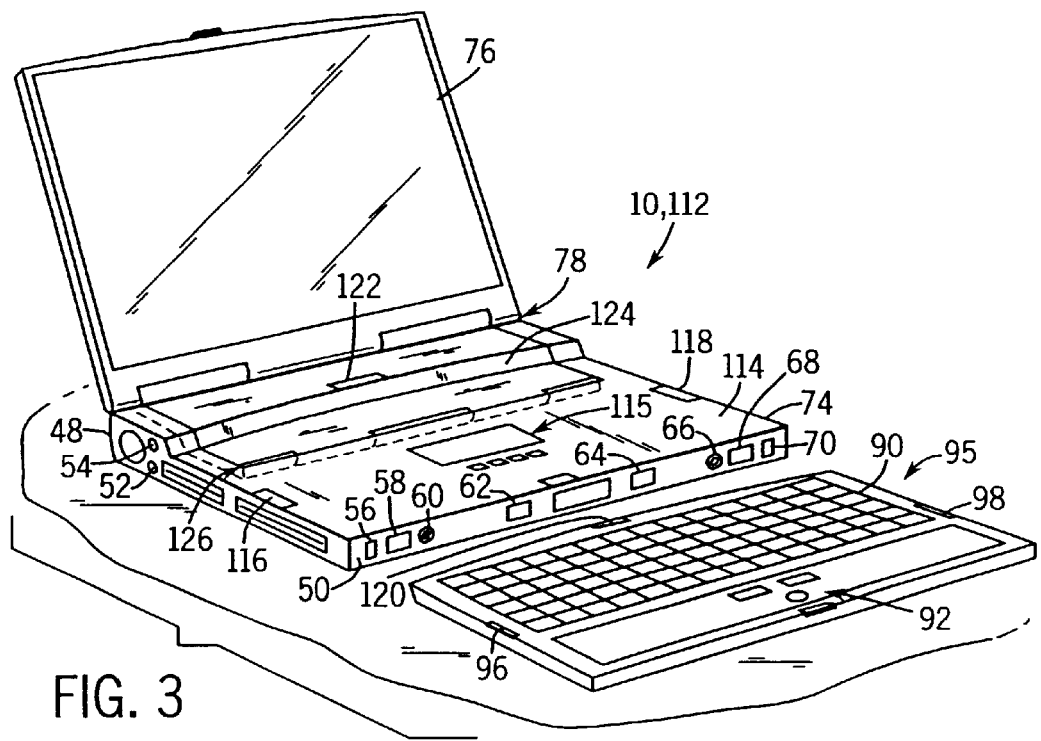
FIG. 3 is a front perspective view of the computing device illustrated in FIG. 2 having a keyboard removed from a receptacle on the computing device.

FIG. 3 is a perspective view of the computing device 10 in an operational configuration 112. As illustrated, the display 76 is in an upright orientation with respect to the base 74. The base 74 is orientated in a horizontal configuration having the removable user interaction device 95 removed from a receptacle 114, or recessed surface, which is disposed between the rear 48 and the front 50 of the base 74. As illustrated, a display assembly 115 (e.g., an LCD and buttons) also may be disposed in the receptacle 114 to provide system status information, time and other information and also to interact with the computing device 10. The receptacle 114 also has latches 116 and 118 on the sides 44 and 46 of the base 74. Accordingly, the latches 116 and 118 interact with the releases 96 and 98, respectively, to removably couple the user interaction device 95 to the base 74 in the receptacle 114. The user interaction device 95 also has a communication port, such as a wireless communication port 120, to communicate wirelessly with one of the ports 52-70 on the computing device 10. Moreover, the user interaction device 95 may have a plurality of wireless communication assemblies and ports to facilitate communication with a plurality of other computing devices and systems. The computing device 10 also has a release mechanism, such as a release 122, for releasing a connector arm 124 from the base 74. The connector arm 124 is rotatably coupled to the display 76 at the hinge structure 78 and is rotatably coupled to the base 74 at a hinge structure 126. Accordingly, the display 76 can be oriented at a desired height and angle by rotating the connector arm 124 about the hinge structure 126 and by rotating the display 96 about the hinge structure 78.

Figure 4:
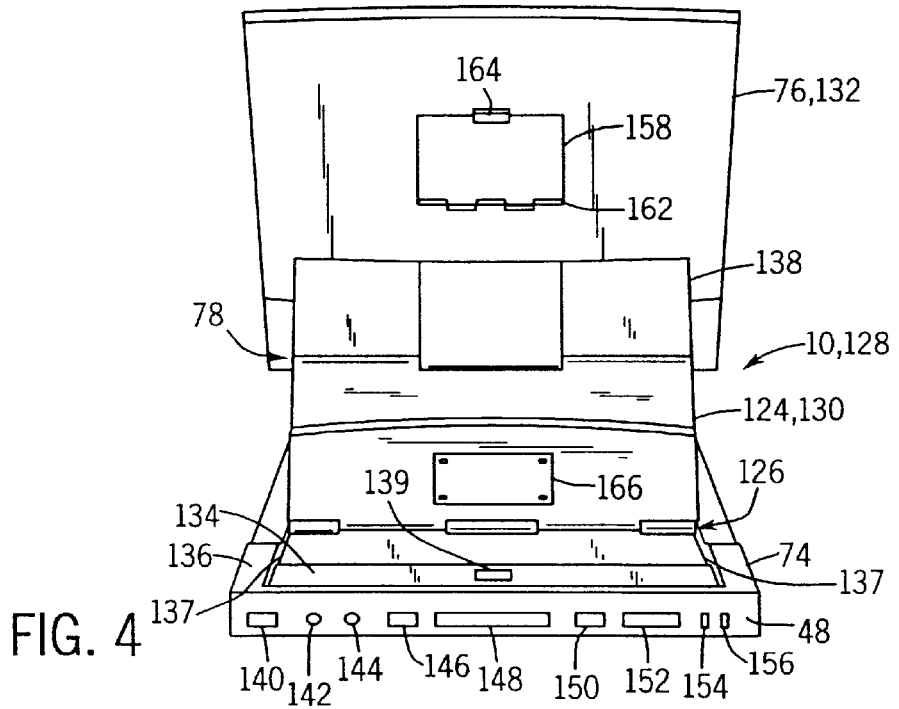
FIG. 4 is a rear perspective view of the computing device illustrated in FIG. 2 in an extended open configuration having a connector section rotatably coupled between the display section and the base section.

It should be noted that the configurations illustrated in FIGS. 3 and 4 facilitate a more efficient utilization of work space for a particular work environment. For example, the computing device 10 may be positioned at a rear portion of a desk or other horizontal surface, while the keyboard 90 and pointing device 92 (e.g., the removable user interaction device 95) may be orientated relatively close to the user. Accordingly, the computing device 10 of the present technique provides the benefits of both portable and stationary computer systems, while eliminating certain drawbacks of each of the respective systems. The present technique also eliminates the need for multiple independent computer systems, such as laptop and desktop computers.

Referring generally to FIG. 4, a rear perspective view of the computing device illustrates the device positioned in an open configuration 128. As illustrated, the computing device has the connector arm 124 rotated about the hinge structure 126 to an upright orientation 130 and having the display 76 rotated about the hinge structure 78 to an upright orientation 132. Relative to the operational configuration 112 illustrated in FIG. 3, the connector arm 124 is rotated outwardly from a receptacle 134 in the base 74 of the computing device 10. In the operational configurations illustrated in FIGS. 1–3, the connector arm 124 is disposed in the receptacle 134 flush with a top surface 136 of the base 74.

The connector arm 124 facilitates multiple orientations of the display 76 and the base 74 to accommodate various space limitations and working environments. In addition to being rotatably coupled to the base 74 and the display 76, the connector arm 124 also may be slidably coupled to one or both of the base 74 and the display 76 at the hinge structures 126 and 78, respectively. For example, the hinge structure 126 may be slidable along a linear positioning assembly (e.g., a rail, a pin and slot assembly or other suitable assemblies) disposed on opposite edges 137 of the receptacle 134. The hinge structure 78 also may be slidable along the display 76 via a linear positioning assembly 138. Accordingly, the display 76 may be angularly oriented by rotational movement about the hinge structures 78 and 126 and may be linearly oriented by linear movement along the linear positioning assemblies. It should also be noted that the computing device 10 may have a release mechanism, such as a slidable release assembly 139, for releasing the display from one or both of the connector arm 124 and the base 74. Accordingly, the display 76 may be removed for independent mounting or exchange with a desired display. The computing device 10 also may include an electronic coupling assembly between the display 76 and the base 74 and circuitry configured to facilitate hot-plugging of the display 76. Thus, the present technique facilitates multiple configurations and versatility to adapt to multiple environments.

The computing device 10 also may have a plurality of ports and other communication devices disposed in the rear 48 of the base 74. For example, the rear 48 may include ports 140, 142, 144, 146, 148, 150, 152, 154, and 156, which may include a power port, a serial port, a PS/2 port, a game port, a docking port, a parallel port, a USB port, a wireless port, and a variety of other ports and communication technologies. The computing device 10 also may include one or more computing components (e.g., circuitry, memory, processor, etc.) disposed in the display 76 and the connector arm 124. For example, the display 76 may include a panel 158 rotatably coupled to the display 76 via a hinge assembly 162 and a latch assembly 164 to facilitate insertion of and access to computing components in the display 76. Similarly, the connector arm 124 may include a panel 166 having a plurality of screws or other coupling assemblies to secure the panel 160 to the connector arm 124. Accordingly, a variety of electronics and computing components may be installed and accessed in both the display 76 and the connector arm 124 via the panels 158 and 166.

Figure 5:
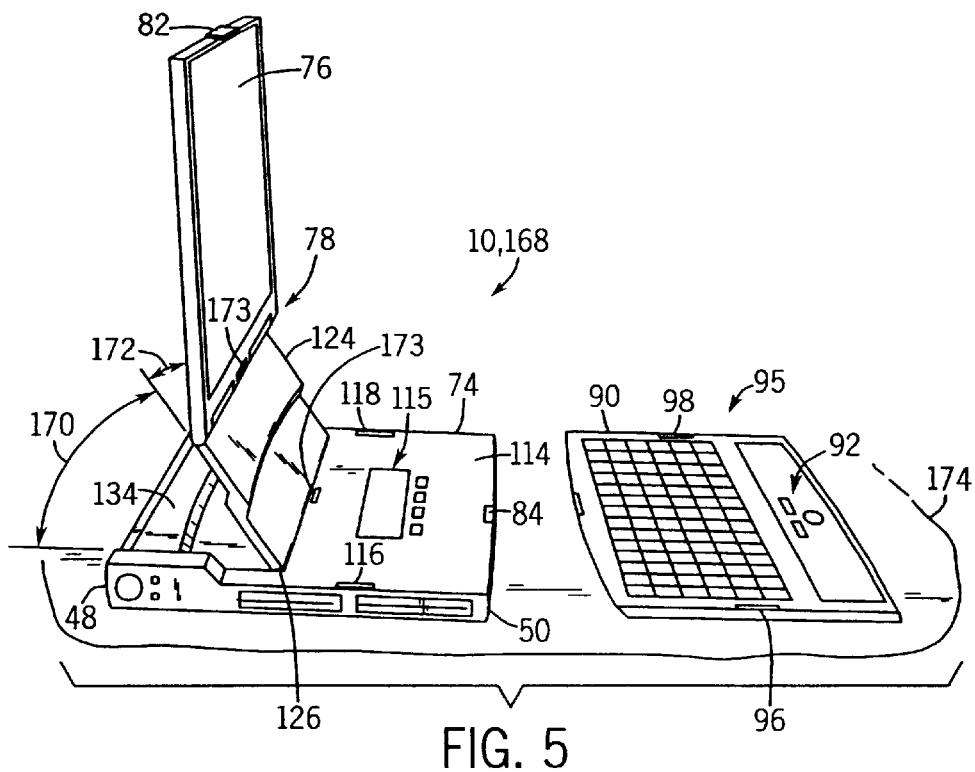
FIG. 5 is a side perspective view of the computing device illustrated in FIG. 4 having the keyboard removed from the receptacle.
Figure 6:
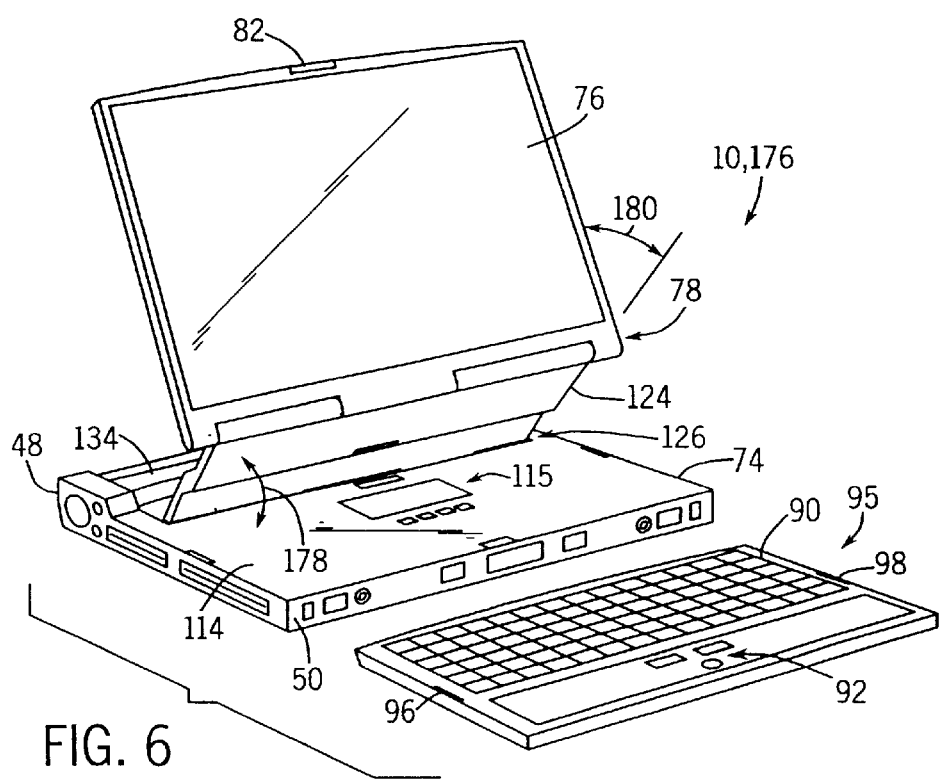
FIG. 6 is a front perspective view of the computing device illustrated in FIG. 5.

In FIG. 5, computing device 10 is displayed from a side perspective view in an operational configuration 168. As illustrated, the connector arm 124 has been rotated about the hinge structure 126 outwardly from the receptacle 134 to an angular orientation 170. The display 76 has been rotated about the hinge structure 78 to an angular orientation 172. In this operational configuration 168, the angular orientation 170 is directed backwardly toward the rear 48 of the base 74 of the computing device 10. The connector arm 124 also may be rotated to other angular orientations, as illustrated in FIGS. 6 and 10. The angular orientations 170 and 172 may be supported by a variety of support assemblies, such as a tension assembly, an angular lock assembly, or other supports. For example, angular support mechanisms 173 may be disposed on the computing device 10 adjacent the hinge structures 78 and 126 to control the tension of the hinge structures 78 and 126 and to lock the display 76 and the connector arm 124 at the desired angular orientations 170 and 172. The operational configuration 168 also has the removable interaction device 95 removed from the receptacle 114 and disposed on the horizontal surface 174. Accordingly, the present technique facilitates a plurality of angles and positions of the display 76 and the removable user interaction device 95, which has the keyboard 90 and the pointing device 92.

FIG. 6 is a perspective view of a computing device 10 in an operational configuration 176. As illustrated, the connector arm 124 has been rotated about the hinge structure 126 outwardly from the receptacle 134 to an angular orientation 178. The display 76 has been rotated about the hinge structure 78 to an angular orientation 180. In this operational configuration 176, the angular orientation 178 is directed toward the front 50 of the base 74 of the computing device 10. Accordingly, rotation of the connector arm 124 toward the front 50 positions the display 76 toward the front 50 and closer to the user. The display 76 also may be linearly positioned by linear positioning assemblies disposed at the opposite ends of the connector arm 124, as discussed above. The operational configuration 176 also has the removable user interaction device 95 removed from the receptacle 114 and disposed on the horizontal surface 174.

Referring generally to FIGS. 7–10, various operational configurations of the computing device 10 and various positions and angles of the base 74, the display 76, the connector arm 124 and the removable interaction device 95 are illustrated. FIG. 7 is a side view of the computing device 10 in a closed configuration 182. As illustrated, the removable user interaction device 95 is sandwiched between the display 76 and the base 74. In this closed configuration 182, the display screen 80 of the display 76 is positioned inwardly toward the base 74 and the removable user interaction device 95. Accordingly, the closed configuration 182 may facilitate mobile transport of the computing device 10 between a variety of working environments.

FIG. 8 is a side view of the computing device 10 in the operational configuration 72, as illustrated in FIG. 2. Relative to the closed configuration 182 illustrated in FIG. 7, the operational configuration 72 has the display 76 rotated about the hinge structure 78 outwardly from the base 74 to an angle 184 relative to the base 74. In operation, the user may orient the display 76 in the desired angle and interact with the computing device 10 locally via the removable user interaction device 95. The user also may separate the removable interaction device 95 from the receptacle 114, as illustrated in FIG. 9.

FIG. 9 is a side view of the computing device 10 in an operational configuration 186. As illustrated, the display 76 has been rotated about the hinge structure 78 to the angle 184. The removable user interaction device 95 has been separated from the base 74 and has been positioned in a desired orientation for remote interaction with the computing device 10. Accordingly, the computing device 10 may be positioned at a rear portion of a desk or at any other desired location, while the user remotely inputs data and interacts with the computing device 10 via the removable user interaction device 95.

FIG. 10 is a side view of the computing device 10 in the open configuration 128, illustrating both of the operational configurations 168 and 176 shown in FIGS. 5 and 6, respectively. As illustrated, the connector arm 124 has been rotated about the hinge structure 126 outwardly from the receptacle 134 to the angular orientation 170. The display 76 has been rotated about the hinge structure 78 to the angular orientation 172. The connector arm 124 and the display 76 may be rotated about the respective hinge structures 126 and 78 to any desired angular orientation and position desired by the user. For example, as illustrated by the dashed lines, the connector arm 124 may be rotated about the hinge structure 126 to the angular orientation 178 and the display 76 may be rotated about the hinge structure 78 to the angular orientation 180, as illustrated in FIG. 6. The open configuration 128 also has the removable user interaction device 95 separated from the receptacle 114 and disposed on a desired surface, such as the horizontal surface 174. Accordingly, the connector arm 124 and the multiple hinge structures 126 and 78 facilitate a plurality of angular orientations and positions of the display to provide maximum flexibility for viewing and operation of the computing device 10.

Figure 11:
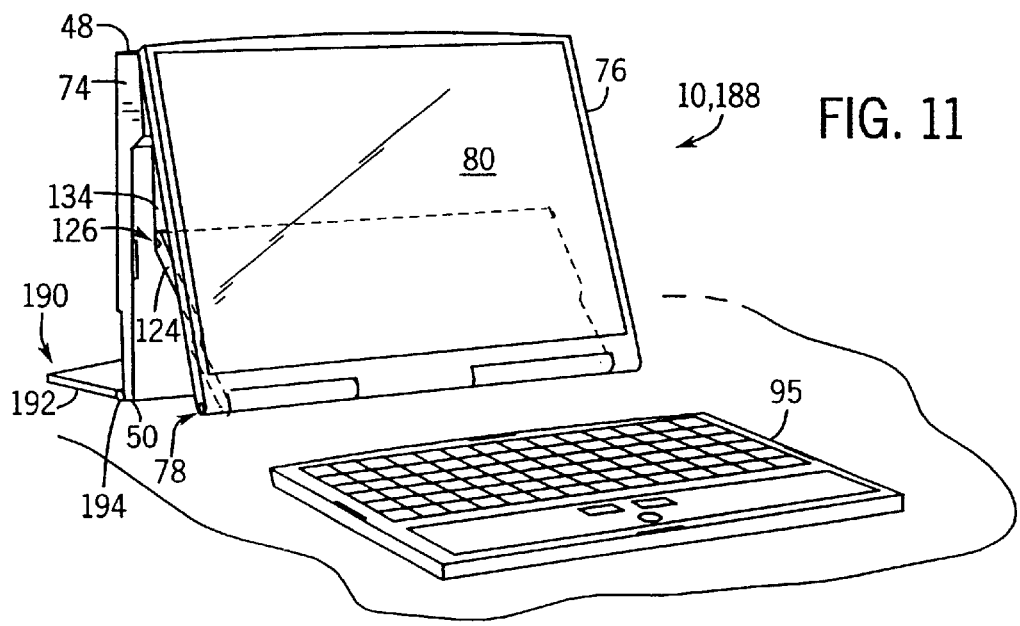
FIG. 11 is a front perspective view of the computing device in an upright orientation having the display section disposed adjacent the base section in an outwardly facing orientation.
Figure 12:
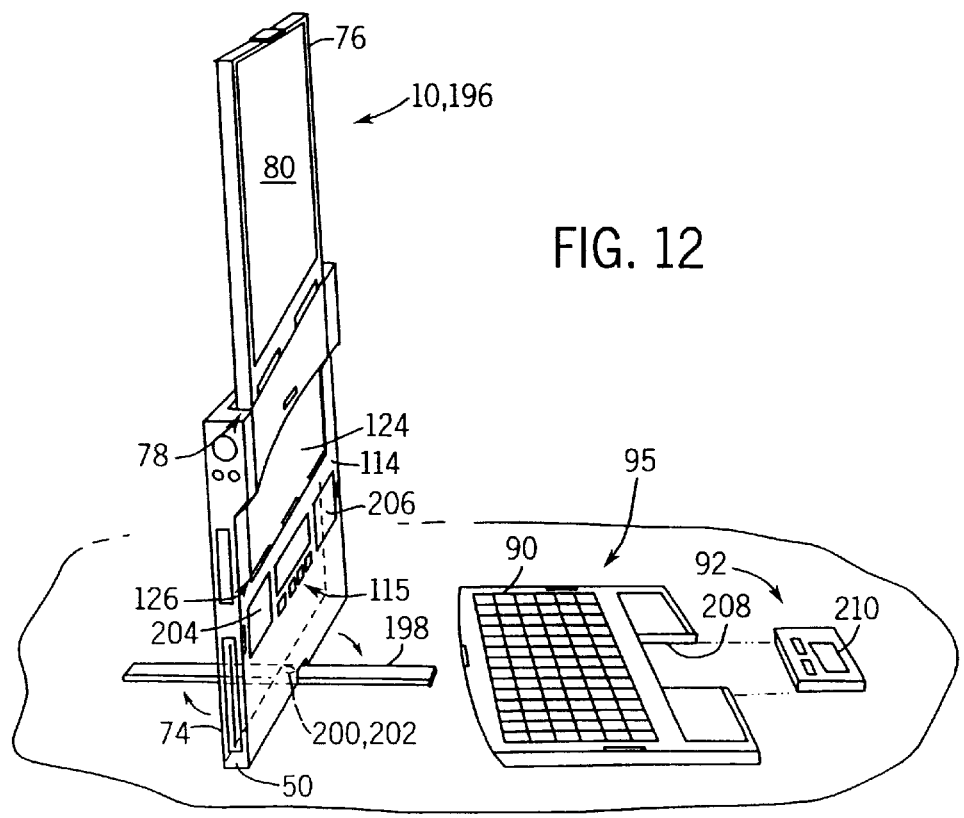
FIG. 12 is a front perspective view of the computing device in an upright orientation having the display section disposed above the base section in an outwardly facing orientation.

Perspective views of the computing device 10 having an upright orientation of the base 74 are provided in FIGS. 11 and 12. FIG. 11 is a perspective view of the computing device 10 in an operational configuration 188. As illustrated, the connector arm 124 has been rotated about the hinge structure 126 outwardly from the receptacle 134 from the rear 48 and toward the front 50 of the base 74. Accordingly, the connector arm 124 has been rotated approximately 180 degrees from the rear 48 to the front 50. Relative to the closed configuration 182 illustrated in FIG. 7, the display 76 has been rotated about the hinge structure 78 approximately 180 degrees, such that the display 76 is positioned adjacent the base 74 with the display screen 80 facing outwardly from the base 74 for viewing by the user. A mounting assembly 190 is also provided for mounting the computing device 10 in an upright orientation. The mounting assembly 190 includes a foot member 192, which is rotatably coupled to the front 50 of the base 74 by a hinge assembly 194, to support the upright orientation. The operational configuration 188 also has the removable user interaction device 95 separated from the base 74 and disposed in a desired location. Accordingly, the operational configuration 188 minimizes horizontal space consumption by the computing device 10, while facilitating remote user interaction with the computing device 10 via the removable user interaction device 95.

FIG. 12 is a perspective view of the computing device 10 in an operational configuration 196. As illustrated, the display 76 has been rotated approximately 180 degrees about the hinge structure 78 to position both the base 74 and the display 76 in an upright orientation for viewing and user interaction by a user. The computing device 10 is supported in the upright orientation by a foot member 198, which is rotatably coupled to the front 50 of the base 74 via a hinge structure 200 disposed at a central portion 202 of the front 50 and the foot member 198. A variety of other horizontal supports also may be utilized within the scope of the present technique. As illustrated, the computing device 10 also has speakers 204 and 206 disposed adjacent the display assembly 115. Thus, the computing device 10 has the display screen 80, the speakers 204 and 206, and the display assembly 115 facing toward the user to facilitate user interaction with the computing device 10. The operational configuration 196 also has the removable user interaction device 95 separated from the base 74 and disposed in a desired location for remote interaction with the computing device 10. Also note that the removable user interaction device 95 illustrated in FIG. 12 has the pointing device 92 removed from a receptacle 208 in the removable user interaction device 95. Accordingly, the operational configuration 196 provides additional flexibility by facilitating the separation of the keyboard 90 and the pointing device 92, both of which may wirelessly communicate with the computing device 10. As illustrated, the pointing device 92 has a touch pad 210 rather than the roller ball 108 illustrated in FIGS. 1–6. Various other modifications also may be made within the scope of the present technique. For example, the present technique may utilize a plurality of the connector arms 124 and additional hinge structures or assemblies to facilitate multiple operational configurations for the user.

While the invention may be susceptible to various modifications and alternative forms, specific embodiments have been shown by way of example in the drawings and have been described in detail herein. However, it should be understood that the invention is not intended to be limited to the particular forms disclosed. For example, the present technique may be applied to a variety of computing systems, computing components, and other electronic and computing devices, each having various components and features. The present technique also may use a variety of mounting structures to position the particular device in the desired location. Moreover, a broad spectrum of electronic and communication technologies can be employed within the scope of the present technique. For example, wireless communication, blue tooth technologies, hot-plugging and plug-n-play technologies, optical and digital technologies, and other emerging technologies are all within the scope of the present technique. Accordingly, the invention is intended to cover all modifications, equivalents, and alternatives falling within the spirit and scope of the invention as defined by the following appended claims.

What is claimed is:

1. A computer, comprising:
a multi-configurable computer structure, comprising:
a first section having computing circuitry;
a second section rotatably coupled to the first section; and
a display rotatably coupled to the second section, wherein the display is removably coupled to the second section via a display mount assembly.

2. The computer of claim 1, wherein the first section comprises a flat panel component housing.

3. The computer of claim 1, wherein the computing circuitry comprises a processor.

4. The computer of claim 1, wherein the multi-configurable computer structure comprises a user interaction device operably coupled to the computing circuitry.

5. The computer of claim 1, wherein the second section and the display are foldable with the first section to form a generally flat geometrical configuration.

6. The computer of claim 1, wherein the multi-configurable computer structure comprises a support assembly configured to support desired angular orientations between the first and second sections and between the second section and the display.

7. The computer of claim 1, wherein the display comprises a flat panel display.

8. The computer of claim 1, wherein the display mount assembly comprises an electrical coupling assembly configured to facilitate separation of the display from the computing circuitry during operation of the computer.

9. The computer of claim 1, comprising a mount assembly coupled to the multi-configurable computer structure, wherein the mount assembly facilitates an upright orientation of the first section.

10. The computer of claim 1, wherein the second section is slidably coupled to the first section via a linear positioning assembly.

11. The computer of claim 3, wherein the computing circuitry comprises a mobile power assembly.

12. The computer of claim 4, wherein the user interaction device comprises a wireless communication assembly.

13. The computer of claim 4, wherein the user interaction device comprises a graphical coordination device that is separable from the multi-configurable computer structure.

14. The computer of claim 4, wherein the user interaction device comprises a keyboard that is separable from the multi-configurable computer structure.

15. The computer of claim 5, wherein the display is foldable to a closed position having a display screen of the display facing the first section.

16. The computer of claim 5, wherein the display is foldable to an open position having a display screen of the display facing outwardly from the first section.

17. The computer of claim 6, wherein the desired angular orientations comprise an upright orientation configured to facilitate positioning of the display in a desired viewing orientation.

18. A space saving system for a computing device, comprising:
a display; and
a multi-sectional body rotatably coupled together and rotatably coupled to the display to facilitate multiple geometrical configurations, wherein the multi-sectional body is configured to house computing circuitry, the multi-sectional body comprising:
a panel-shaped component housing comprising computing circuitry; and
a connector member having a first end rotatably coupled to the panel-shaped component housing and having a second end rotatably coupled to the display.

19. The space saving system of claim 18, wherein the display comprises a panel display assembly.

20. The space saving system of claim 18, wherein the first end is rotatably coupled to a central portion of the panel-shaped component housing.

21. The space saving system of claim 18, comprising a processor disposed in the multi-sectional body.

22. The space saving system of claim 18, comprising an input device removably coupled to the multi-sectional body.

23. The space saving system of claim 18, comprising a support structure for supporting at least a portion of the multi-sectional body in an upright orientation.

24. The computer structure of claim 18, wherein the multiple of geometrical configurations comprises a folded configuration having a substantially flat arrangement of the multi-sectional body and the display.

25. The computer structure of claim 18, wherein the multiple of geometrical configurations comprise an operational configuration having the display positioned at a desired viewing orientation and having at least a portion of the multi-sectional body positioned at a desired orientation for mounting on a surface.

26. A space saving system for a computing device, comprising:
a display; and
a multi-sectional body rotatably coupled together and rotatably coupled to the display to facilitate multiple geometrical configurations, wherein the multi-sectional body is configured to house computing circuitry
a display coupling assembly disposed between the display and the multi-sectional body, wherein the display coupling assembly is configured for removably coupling the display to the multi-sectional body.

27. A method of forming a versatile computing device, comprising:
rotatably coupling a plurality of body sections, at least one of which is configured to house computing circuitry, wherein rotatably coupling the plurality of body sections comprises rotatably coupling an arm section to a housing section;
rotatably coupling a display to the arm section of the plurality of body sections; and
facilitating geometrical adaptation of the plurality of body sections and the display to a desired application.

28. The method of claim 27, wherein rotatably coupling the arm section to the housing section comprises rotatably coupling the arm section to a central portion of the housing section.

29. The method of claim 27, wherein facilitating geometrical adaptation comprises supporting a folded configuration having a substantially flat orientation of the plurality of body sections and the display.

30. The method of claim 27, wherein facilitating geometrical adaptation comprises supporting an operational configuration having at least one of the plurality of body sections and the display in a substantially upright orientation.

31. The method of claim 27, comprising integrating the computing circuitry into at least one of the plurality of body sections, wherein the computing circuitry comprises a processor.

32. The method of claim 27, comprising removably coupling an input device to at least one of the plurality of body sections.

33. The method of claim 31, wherein integrating the computing circuitry comprises providing a wireless communication assembly.

34. A method for versatile computing, comprising:
  geometrically adapting a computing device to a desired environment of a plurality of environments by manipulating a plurality of device sections about a plurality of rotational axes disposed between the device sections, comprising:
    facilitating rotation of a component housing section about a first axis of the plurality of rotational axes;
    facilitating rotation of a display section about a second axis of the plurality of rotational axes, wherein facilitating rotation of the display section comprises facilitating rotation of a connector arm that is rotatably coupled to the display section at a first end and that is rotatably coupled to the component housing section at a second end.

35. The method of claim 34, wherein geometrically adapting comprises configuring at least one of the device sections to adapt to an available space in the desired environment.

36. The method of claim 34, wherein facilitating rotation of the connector arm comprises facilitating rotation of the connector arm about a central portion of the component housing section.

37. The method of claim 34, comprising facilitating wireless communication between the computing device and at least one separable input device.

38. The method of claim 34, wherein geometrically adapting comprises manipulating the device sections to a substantially flat orientation.

39. The method of claim 34, wherein geometrically adapting comprises facilitating an operational configuration having at least one of the device sections positioned at a desired angle relative to the other device sections.

* * * * *